United States Patent
Naik et al.

(10) Patent No.: US 11,487,341 B2
(45) Date of Patent: Nov. 1, 2022

(54) TECHNIQUES FOR CONFIGURING A PROCESSOR TO EXECUTE INSTRUCTIONS EFFICIENTLY

(71) Applicant: NVIDIA Corporation, Santa Clara, CA (US)

(72) Inventors: Aniket Naik, Fremont, CA (US); Tezaswi Raja, San Jose, CA (US); Kevin Wilder, Menlo Park, CA (US); Rajeshwaran Selvanesan, Cupertino, CA (US); Divya Ramakrishnan, San Jose, CA (US); Daniel Rodriguez, Dublin, CA (US); Benjamin Faulkner, San Jose, CA (US); Raj Jayakar, San Jose, CA (US); Fei (Walter) Li, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 527 days.

(21) Appl. No.: 16/460,615

(22) Filed: Jul. 2, 2019

(65) Prior Publication Data
US 2020/0050251 A1 Feb. 13, 2020

Related U.S. Application Data

(60) Provisional application No. 62/716,538, filed on Aug. 9, 2018.

(51) Int. Cl.
*G06F 1/324* (2019.01)
*G06F 9/38* (2018.01)

(52) U.S. Cl.
CPC ............ *G06F 1/324* (2013.01); *G06F 9/3869* (2013.01); *G06F 9/3818* (2013.01)

(58) Field of Classification Search
CPC ....... G06F 1/324; G06F 9/3879; G06F 9/3818
See application file for complete search history.

(56) References Cited

U.S. PATENT DOCUMENTS

| 9,509,318 B2* | 11/2016 | Winemiller | G06F 1/3293 |
|---|---|---|---|
| 2009/0300329 A1* | 12/2009 | Naffziger | G06F 1/3203 712/205 |
| 2013/0111191 A1* | 5/2013 | Murray | G06F 11/30 712/214 |

(Continued)

*Primary Examiner* — Vincent H Tran
(74) *Attorney, Agent, or Firm* — Nixon & Vanderhye PC

(57) ABSTRACT

Systems and techniques for improving the performance of circuits while adapting to dynamic voltage drops caused by the execution of noisy instructions (e.g. high power consuming instructions) are provided. The performance is improved by slowing down the frequency of operation selectively for types of noisy instructions. An example technique controls a clock by detecting an instruction of a predetermined noisy type that is predicted to have a predefined noise characteristic (e.g. a high level of noise generated on the voltage rails of a circuit due to greater amount of current drawn by the instruction), and, responsive to the detecting, deceasing a frequency of the clock. The detecting occurs before execution of the instruction. The changing of the frequency in accordance with instruction type enables the circuits to be operated at high frequencies even if some of the workloads include instructions for which the frequency of operation is slowed down.

25 Claims, 14 Drawing Sheets

(56) References Cited

U.S. PATENT DOCUMENTS

| | | | | |
|---|---|---|---|---|
| 2013/0275787 A1* | 10/2013 | Safford | ............... | G06F 1/3234 |
| | | | | 713/320 |
| 2014/0157277 A1* | 6/2014 | Eisen | ..................... | G06F 1/329 |
| | | | | 718/102 |
| 2014/0317422 A1* | 10/2014 | Rosenzweig | ........... | G06F 1/324 |
| | | | | 713/300 |
| 2014/0317425 A1* | 10/2014 | Lien | ....................... | G06F 1/324 |
| | | | | 713/320 |
| 2014/0380066 A1* | 12/2014 | Takayanagi | ........... | G06F 1/3296 |
| | | | | 713/300 |
| 2015/0378412 A1* | 12/2015 | Suryanarayanan | ... | G06F 9/3824 |
| | | | | 713/340 |
| 2016/0013774 A1* | 1/2016 | Park | .................... | G11C 7/1057 |
| | | | | 327/108 |
| 2017/0249000 A1* | 8/2017 | Ragland | ................ | G06F 9/3016 |
| 2018/0018009 A1* | 1/2018 | Kommrusch | ........... | G06F 1/324 |
| 2019/0108087 A1* | 4/2019 | Biran | ..................... | G06F 1/324 |
| 2019/0310698 A1* | 10/2019 | Mehra | .................... | G06F 1/305 |

\* cited by examiner

TECHNIQUES FOR CONFIGURING A PROCESSOR TO EXECUTE INSTRUCTIONS EFFICIENTLY

CROSS-REFERENCE TO RELATED APPLICATIONS

This application claims priority to U.S. Provisional Patent Application No. 62/716,538, filed on Aug. 9, 2018, titled "Fast Clock Slowdown Based on Instruction Type", the entire content of which is herein incorporated by reference.

TECHNICAL FIELD

This disclosure relates to power management in processors, and more particularly to changing clock speed and/or power instruction based on the type of instruction being executed. More particularly, this disclosure relates to dynamically controlling a clock frequency in a manner that is adaptive to noise, and the consequent voltage drop, associated with the execution of certain types of instructions.

BACKGROUND

Modern processors are very complex and contain many millions of transistors on a single substrate. While each individual transistor consumes only a small amount of power, the millions of transistors on the substrate together can consume substantial power. This power consumption generates heat and also uses substantial power from the power supply. Accordingly, power delivery is an important aspect of a modern processor's design.

The wiring used to deliver power on the processor substrate forms the power delivery network. The power delivery network includes for example power rails used to supply electrical current of appropriate voltage to different components on the processor chip. The power delivery network affects many performance aspects such as, for example, the amount of noise on the voltage rails. The term "noise", as used in this document, refers to transient variations in voltage occurring on the voltage rails. While the power supply can be designed to be virtually noise free, the processor itself generates noise on its internal power delivery network. For example, executing high capability instructions that switch many transistors on the chip at or near the same time can cause momentary voltage fluctuations on the voltage rails. Excessive noise on the voltage rails may cause various circuit operating failures such as, for example, the processor being unable to obtain the power (current and/or voltage) required for its operating frequency, thereby causing timing errors, erroneous switching and the like.

In more detail, one or more voltage rails supply power from a power source such as a power supply to a processor. A voltage regulator typically controls the voltage on each of the voltage rails to one or more pads of the processor (or the integrated circuit that includes the processor) in accordance with the power requirements of the various components of the processor. Metal vias and traces distribute the received power at the pads throughout the processor (and/or the integrated circuit). One or more voltage regulators may dynamically shift the supply voltage up or down in accordance with changes in the workload, and thus power requirements, of the processor. The nominally constant voltage of the rail to the processing core is referred to as "$V_{dd}$".

As processors become faster and smaller, the design of the power delivery network within the chip becomes more complex. In general, the faster a processor operates, the more power it consumes. Conversely, slowing down the processor reduces the amount of power required by the various functional units of that processor. The characteristic representation of processor power consumption P makes this relationship between power and the frequency clear: $P=CV^2f$, where C, V and f represent switching capacitance of the processor, voltage seen by the processor and the frequency of the operation of the processor respectively.

The speed at which a circuit operates is affected by the voltage that drives the circuit. Voltage fluctuations (noise) on the voltage rail can cause voltages different from the nominal voltage to the processor circuit(s). A primary factor affecting the magnitude of the noise is the workload being processed by the circuit (or other circuits on the chip). In particular, the dynamic resistive drop (also referred to as "IR drop") component of noise is affected by the current I a particular instruction draws while executing. There are two primary components to noise: Di/dt and IR drop. Di/dt noise depends on the rate of change of current over time, while IR drop depends only on the magnitude of the current. Noise Aware Frequency Locked Loop (NAFLL) techniques may be used to address the Di/dt component of noise. Techniques described in this disclosure are primarily directed to the IR drop.

Different instructions cause different numbers of transistors to switch, drawing different amounts of current and consequently causing different amounts of IR drop on the voltage rail. By way of rough analogy, consider a sweltering day in the middle of a weekday in summer. The thermometer reaches over 100 degrees Fahrenheit (38 degrees Celsius). When everyone in a city gets home from work, the first thing they do is turn on their air conditioners to cool down their living space. The electric grid may not be designed to handle such high peak current draw, causing "brownouts"—i.e., voltage fluctuations deviating from the nominal 110 VAC the electric grid is designed to deliver. Now consider such a situation in microscopic detail on board a modern processor chip, where millions of transistors operate thousands of times a second. This would be like turning hundreds of city's air conditioners on and off in synchronism many times a second. The resulting power fluctuations would create a substantial amount of noise on the city's power delivery network.

As processors get smaller and more complex, the increasing power density among circuits may further exacerbate issues related to noise generated on the voltage rails by the execution of certain instructions.

In some processors, such as, for example, Nvidia graphics processing units (GPUs) from past years, the frequency of operation (i.e. speed) at a voltage $V_{dd}$ is set conservatively so that proper operation will result under even the noisiest expected workloads. Moreover, features such as NAFLL have been implemented to address noise effects on the power distribution network by tracking the noise on the voltage rails and dynamically changing the clock frequency in response. In particular, when a voltage droop is detected on the voltage rail, the NAFLL mechanism drops the clock frequency (i.e., the rate at which the processor's transistors switch) to give the transistors more time for proper operation and ensure there is no circuit failure. This is effective because transistors require higher voltages to switch more quickly. Slowing down the switching rate enables the transistors to operate at the lower, drooped voltage level. When the droop goes away, the clock frequency can be increased. U.S. Patent Publication No. 2018/0123604, for example, describes an example NAFLL that follows this principle.

However, as processors continue to get smaller, faster and more complex, techniques such as NAFLL may not fully address the problems and inefficiencies associated with noise on the voltage rails. Therefore, further improvements in adapting processors to noise-effects of different instruction types are desired.

SUMMARY

Example embodiments rectify some of the deficiencies of the techniques described above for addressing noise-related voltage issued in processors. Systems and methods are disclosed for controlling the operation of a processor in a manner that is adaptive to noise on the voltage rails.

An example embodiment provides a method of controlling a clock of a processor. The method includes detecting an instruction that is predicted to have a predefined noise characteristic, and, responsive to the detecting, changing a frequency of the clock. The detecting may occur before execution of the instruction by the processor.

According to another example embodiment, a system comprising processing circuitry and a clock generator controlling a frequency of operation of the processing circuitry is provided. The processing circuitry is configured to detect an instruction that is predicted to have a predefined noise characteristic, and, responsive to the detecting, signal the clock generator to change a frequency of the clock generator. The detecting may occur before execution of the instruction in the processing circuitry.

DETAILED DESCRIPTION

Figure 1A:
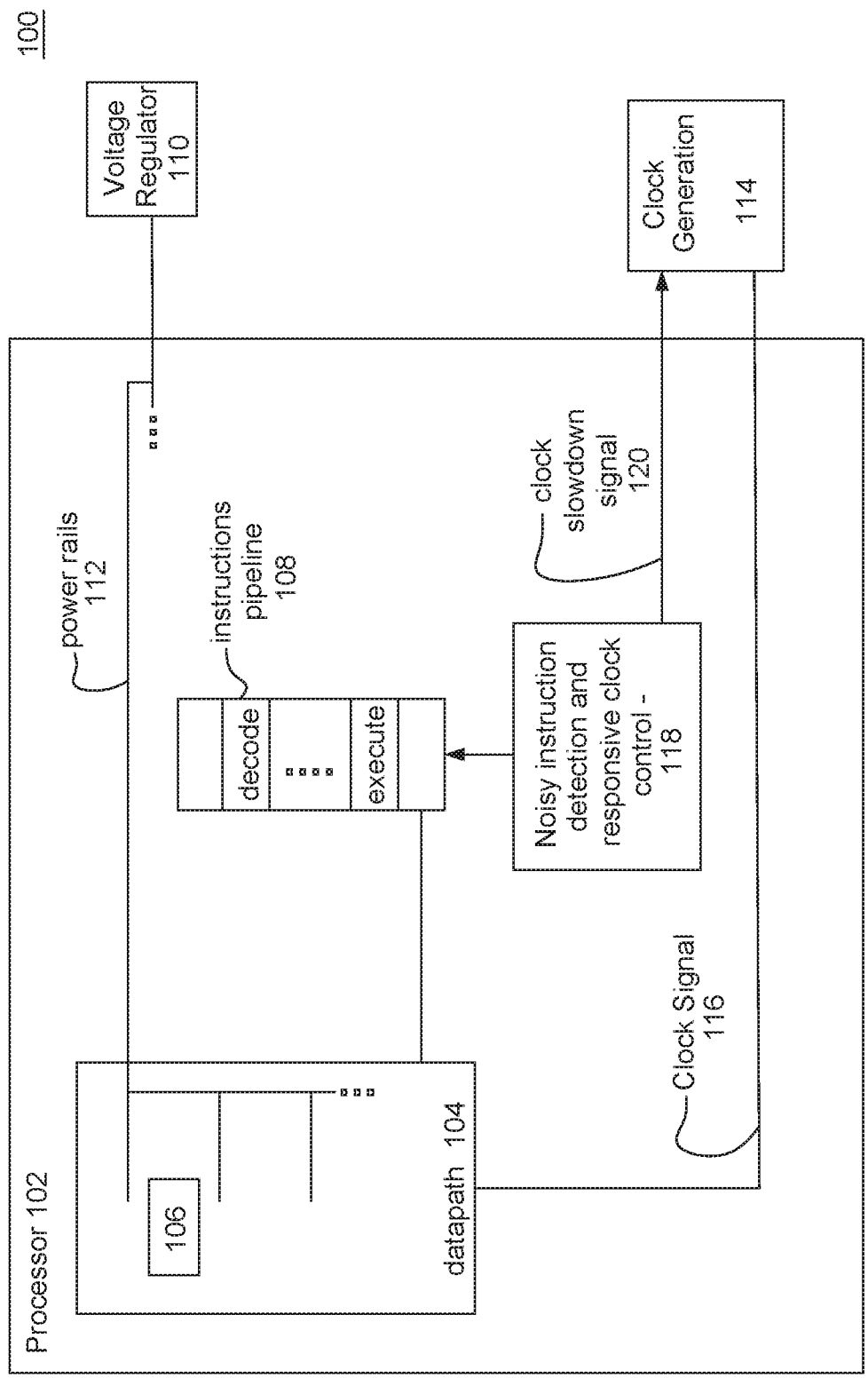
FIG. 1A illustrates a block diagram of a processing system including fast clock slowdown circuitry, according to certain example embodiments.

Certain example embodiments of the present invention dynamically control the frequency of operation of a processor and/or integrated circuit to reduce inefficiencies built into conventional techniques in order to handle dynamic voltage drops caused by noise generated on the power distribution network by certain instructions. For example, some embodiments provide for detecting noisy workloads based on instructions in an instruction pipeline and for rapidly slowing down the clock frequency in time before execution of the detected noisy instructions. Moreover, example embodiments provide for detecting and responding to such noisy workloads in localized processing areas that remain undetected in techniques such as NAFLL.

As mentioned above in the background section, in certain currently commercially available processors the frequency of operation is set such that even the noisiest expected workload can be executed at a given nominal or set voltage (i.e., the frequency is decreased to compensate for the worst possible droop from the nominal voltage). However, this approach is sub-optimal, as it requires that frequency headroom be maintained for all the other workloads that generate lower noise than the worst-case (e.g. noisiest) workload. That is, by setting the frequency in accordance with the noisiest workload, which requires a lower frequency for stable operation, even the less noisy instructions are forced to execute at the decreased frequency. For example, in an example commercially available processor, at a $V_{dd}$ of 900 mV, the operating frequency is set at 1871 MHz for all instructions based on the voltage drop predicted to be caused by the noisiest instruction type, whereas all other instruction types can safely operate at the faster frequency of 1886 MHz, which means frequency headroom of about 15% is left unused when instructions other than the noisiest instruction types are being executed. Similar headroom margins have been observed to range from 2-26% for various $V_{dd}$. This slows down the effective processing rate, which can impact how fast a high performance processor can accomplish complex tasks.

Additionally, in the NAFLL implementations in existing processors, the voltage/noise sensing is performed only at the locations on the chip where the NAFLL logic is physically located. Therefore, noise/voltage droops in other parts of the chip that are localized and that do not propagate to the NAFLL sensing location can be missed by the NAFLL. IR drop, in particular, can be a highly localized phenomenon. Circuits on the chip which have high current density have higher IR drop than what is detected at the NAFLL. The noise that is not detected, and therefore not compensated, by the NAFLL requires to be margined and has been shown to cause a loss of about 3-4% frequency for workloads that generate lower noise. Moreover the NAFLL's response occurs after the noise/voltage has already drooped.

Example embodiments proactively slow down clock frequency based on instruction type to accommodate anticipated or predicted noise (primarily consisting of the IR drop) on the voltage rails. In contrast to NAFLL which responds after the noise/voltage has already drooped, example embodiments are predictive and respond to a predicted noise/voltage droop before the droop occurs. In some embodiments, the clock frequency slowdown compensates for predicted noise that is not compensated by the NAFLL. By selectively slowing down the clock(s) only for instructions of types that are expected to generate high levels of noise, example embodiments provide for instructions which generate lower noise to be clocked at a faster rate than the noisy instructions, thereby improving performance of at least the less noisy instructions. Since, in typical workloads, the majority of the instructions are of less noisy types, example embodiments may also improve the overall performance of the processor and/or integrated circuit having the processor.

Some example embodiments exploit the characteristic that a large surge in current which causes the increase in noise on the voltage rails occurs during instruction execution after the instruction has been already decoded. This allows one or more clocks to be modulated based on the decoded instruction, but before the execution of the decoded instruction commences, proactively offsetting the clock to account for the frequency loss that is incurred due to noise generated during instruction execution. By rapidly modulating one or more clocks to lower the frequency before the execution of certain noisy instructions, example embodiments can provide for the processor to be operated at a lowered frequency only for execution of those noisy instructions.

Systems for Fast Clock Slowdown Based on Instruction Type

FIG. 1A is a block diagram of a system 100 for fast clock slowdown based on instruction type, according to some example embodiments. System 100 is configured to proactively slow down clock frequency based on instruction type in order to accommodate noise (primarily consisting of the IR drop) on the voltage rails. The fast clock slowdown in the example embodiments is implemented by the coordination between a detection and signaling circuitry, an actuation circuitry for the clock slowdown, and a clock generation circuitry. In an example embodiment, a processor 102 may include the detection and signaling component, and the actuation component and a rapid clock slowdown circuitry may be in the clocks logic 114 associated with the processor. In an example embodiment, in which the fast clock slowdown is implemented in a parallel processing unit PPU (e.g. graphics processing unit (GPU)) such as that shown in FIG. 3, the detection and signaling component may be in a streaming multiprocessor (SM, such as that shown in FIG. 4A) of the PPU. Embodiments, however, are not limited to GPUs and other parallel processing units, and may include any instruction processing circuitry that relies upon a controllable clock signal.

The processor 102 receives power over one or more power rails 112 from one or more voltage regulators 110. The voltage regulator(s) 110 controls the voltage from a power supply unit (not shown) according to the requirements of the processor 102. In some example embodiments, the voltage regulator(s) 110 may control the voltages supplied to the processor 102 such that one or more voltage rails to the processor have a voltage that is different from the voltage on another rail to the processor. The power received over the voltage rails 112 is distributed to the various power domains of the processor, including to the various functional units (e.g., arithmetic and logic units (ALU), floating point units (FPU), load/store units, branching units, specialized execution paths, SIMD execution units, etc.) 106 of the datapath 104 of the processing circuitry. The datapath 104 (and also other components of processor 102 or of integrated circuit including processor 102) receives a clock signal 116 from the one or more clock generators in clocks logic 114.

If the reduced frequency necessitated for noisy instructions were to be set as the clock frequency for all instructions executed on processor 102, as described above, the voltage and frequency headroom left unused during execution of less noisy instructions would result in inefficiencies. Example embodiments avoid setting the clock frequency based on the worst case noisy instruction by taking advantage, as also noted above, of the characteristic that the increase in noise occurs during an instruction's execution and after that instruction has already been decoded in the instruction pipeline 108. This allows the clock signal(s) 116 to be modulated based on a decoded noisy instruction, before the execution of that decoded instruction commences, proactively offsetting the clock frequency to account for the voltage loss that is suffered due to noise during instruction execution. An instruction's execution commences when the instruction reaches the execution stage in the instruction pipeline, and is dispatched to be executed on the datapath 104. More specifically, the surge in current and thus the increase in noise occurs when the various functional units of the datapath are activated in accordance with a noisy instruction, and therefore, the clock frequency in example embodiments is slowed down before the various functional units in the datapath begin executing the noisy instruction.

The instruction pipeline 108 may be a pipeline of any number of pipeline stages including separate pipeline stages for instruction decode and for instruction execution. An example pipeline may have separate pipeline stages for instruction fetch, instruction decode, instruction execute, memory access, and write. Pipelining enables different parts of the processing and control circuitry to be simultaneously used by different instructions that are in the pipeline.

Instruction detection and signaling block 118 includes logic to monitor the instruction pipeline 108. More particularly, the block 118 includes logic to detect when an instruction that can cause some predetermined level of noise on the voltage rails is decoded in the pipeline 108. The detection may be based on instruction type codes (i.e. opcodes) and/or instruction type code and operand combinations. The types of instructions to be detected may be hardcoded and/or may be specified in a programmable table. When hardcoded, according to some embodiments, the classification may be done using current (I) levels as a proxy for noise levels. The classification may be a relative ordering, rather than an absolute ordering (e.g. "instruction A:1 Amp"; "instruction B: 2 Amp"; "instruction C: 2.1 Amp"; "instruction D: 3 Amp"). Assuming a constant resistance (R), I may be considered as a good proxy for IR. Accordingly, for example, instruction A can be classified in low power group, instruction B and C can be classified in moderate power group, and instruction D can be classified in high power group. The particular amounts of slowdown in clock required for each of the groups can be characterized on silicon and programmed in the slowdown table. Therefore, as made clear by the above description, in certain embodiments, the actual noise for each instruction is not necessary for the grouping.

Note that whereas example embodiments detect instructions that can cause certain levels of noise, embodiments compensate for the frequency loss when a high-power instruction is run. The frequency loss could be due to jitter and/or other second-order components as well, but majority of the frequency loss may be due to noise.

The instruction detection and signaling block 118 may also include logic to engage in signaling with clocks logic 114 in response to the detection of predetermined instructions types in the pipeline 108. For example, the signaling to the clock circuitry 114 may include asserting a clock slowdown signal 120 in response to detecting a noisy instruction in the pipeline 108.

In addition, at least in some embodiments, the instruction detection and signaling block 118 may also include interlock logic to stall the pipeline 108 until the clock is slowed down in response to a detection of a noisy instruction in the pipeline.

Although FIG. 1A illustrates the clocks logic 114 being located externally to the processor 102, embodiments are not limited thereto. Example embodiments may include various combinations of processing circuitry and clocks logic, such as, for example, processing circuitry and clock logic on the same die, a single clock for each processor, a single clock shared by multiple processors, etc. where the communication between the processing circuitry and clocks logic is sufficiently fast and efficient so that clock slowdown can be requested and made effective during the time interval between an instruction's decoding and the start of its execution.

Figure 1B:
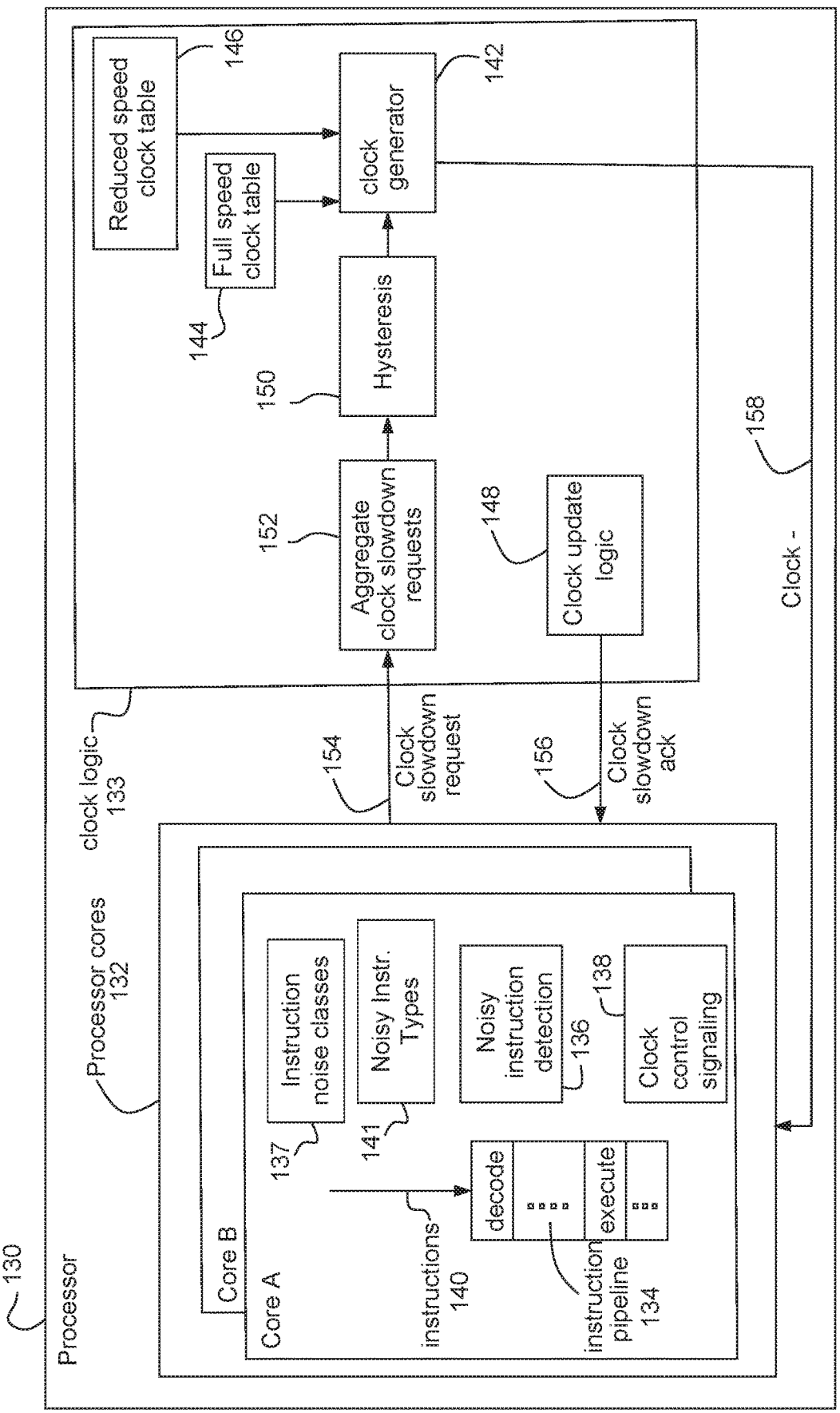
FIG. 1B illustrates a block diagram of a processor implementing fast clock slowdown, according to certain example embodiments.

FIG. 1B illustrates a block diagram of a processor 130 according to some example embodiments. Processor 130, according to some embodiments, may be identical to processor 102 but with the clocks logic being located on the same die as processor 102. As in FIG. 1A, processor 130 also receives power over one or more voltage rails controlled by one or more voltage regulators. Neither the voltage rails nor voltage regulators are separately shown in FIG. 1B.

The processor 130 includes one or more processing cores 132 (e.g. core A and core B), and clocks logic 133. The clocks logic 133 provides a clock signal 158 to control the frequency of operation of the one or more processing cores 132.

A noisy instruction detection and stall block 136 is configured to detect certain predetermined instruction types 141 in the instructions 140 in the instruction pipeline 134, before the execute stage of the pipeline in which those instructions are executed by the processor core(s) 132. The predetermined instructions types 141 (also referred to as "noisy instruction types") that are to be detected may be hardcoded and/or specified in a programmable table. According to some embodiments, the instructions detected for clock slowdown include certain high power instructions. That is, the detected instructions are instructions that are expected to consume an amount of power that is above some threshold. For example, certain matrix multiply instructions utilize more functional units in the datapath and/or use a datapath having very high gate density, and are thus a more prolific consumer of power than many other instruction types. For example, according to an embodiment, a Half-precision Matrix Multiply Accumulate (HMMA) instruction may utilize a specialized high gate density HMMA datapath in an SM (e.g. an SM is described in relation to FIG. 4A) that is more power consuming than many instructions and that is also prone to generate more noise on the voltage rails than many other instructions. The noise and resulting voltage drop of HMMA instructions may be localized to the proximity of the HMMA datapath. The HMMA instruction is described, for example, in U.S. application Ser. No. 15/826,435 filed on Nov. 29, 2017, which is hereby incorporated by reference in its entirety. Block 136 may thus monitor the instruction pipeline to detect when a high power instruction is decoded (or is being decoded). However, some embodiments may be configured to detect one or more noisy instructions that are not necessarily high power instructions, but that generate substantial noise on the voltage rails (e.g. due to the density of the simultaneously activated portions of the datapath, etc.).

A clock control signaling block 138 is configured to assert a clock slowdown signal 154 in response to a detection made by the noisy instruction detection block 136. The clock slowdown signal 154 is a request for the clocks logic 133 to slowdown the clock signal 158 provided to the processor cores 132.

In some embodiments, the clocks logic 133 may provide a clock slowdown ack signal 156 in response to receiving the clock slowdown request signal 154, indicating that it has effected the requested clock slowdown.

In some embodiments, the noisy instruction detection and stall block 136 also includes logic to stall the instruction pipeline 134 in response to asserting the clock slowdown request signal 154, until it is determined that the clock frequency has been slowed down as requested. Upon receipt of the ack signal 156 the pipeline can be unstalled, so that the detected noisy instruction can be dispatched for execution. The stalling helps ensure that a detected noisy instruction is not executed before the clock is slowed down in response to the detection. In some embodiments, where the delay between instruction decode and execute is too small for the clock slowdown to actuate, block 136 may also include logic to stall.

The clocks logic 133, in the embodiment illustrated in FIG. 1B, is provided on the same die as the processor core(s) 132. In some embodiments, however, the clock logic 133 may not be located on the same die as the processor cores that detect and/or execute noisy instructions.

The signaling paths for signals 154 and 156 between processor core(s) 132 and clock logic 133 are configured for low latency. In embodiments, it is highly desirable to keep the latency on the signaling paths and the time for the clock to effect the slowdown low so that the instruction pipeline does not have to be delayed. In some embodiments, request/acknowledge messages (e.g. REQ/ACK bits) may move between SM and clocks via retiming stages. Such retiming stages may, for example, be custom-selected and/or custom-placed. Between retiming flops, the data may be routed in a similar manner to trunk clocks, for example, via large clock buffers to drive wide, upper-metal-layer, shielded nets, using custom routing rules that eliminate costly routes. In some embodiments, an example level of latency between decode to execute may be 12 cycles or similar, and an example latency between req to clock change may be 10 cycles or similar. Therefore, in example embodiments, clock slowdown happens before decoded instruction reaches execute.

The clocks logic 133 may include a clock generator block 142 and a clock update block 148. In some embodiments, the clock generator block 142 may include a clock source such as a digital voltage controlled oscillator (DVCO) clock source a NAFLL mechanism such as that described in U.S. patent application Ser. No. 15/340,901 filed on Nov. 1, 2916 (US Patent Publication No. 2018/0123604), which is hereby incorporated by reference in its entirety.

The clock frequency change technique described in U.S. patent application Ser. No. 15/340,901 may, however, be inadequate to satisfy the time constraints for rapid slowdown required in certain example embodiments in order to achieve the slowdown in the short time interval between the decode and execute pipeline stages of an instruction. In some embodiments, the clock frequency change is effected by performing a lookup in a lookup table such as either of tables 144 and 146. In an embodiment in which the clock frequency is configurable to either "full speed" (e.g. maximum frequency of operation possible without margining for voltage noise) and "reduced speed" (e.g. maximum frequency of operation possible with margining for noise), lookup table 144 may provide a voltage-frequency curve (VF curve) for full speed operation, and table 146 may provide a VF curve for reduced speed operation. In response to the clock slowdown request 154, some embodiments may change the frequency at the current voltage to the VF curve in table 146 (reduced speed operation).

In another embodiment, there may be no lookup table, and the clock source or other clock generator may be set to the frequency requested with the clock slowdown At block 152, the incoming clock slowdown requests may be aggregated. For example, block 152 determines the clock slowdown request requiring a largest slowdown from among the slowdown requests 154 received from respective processing cores 132, and then forwards that to the clock generator block 142. This ensures that the adjusted clock frequency is at or lower than the clock frequency required for safely executing all the instructions that are to be executed at any instance in time.

A hysteresis block 150 may be located in the signal path 154 between the aggregation block 152 and clock generator block 142. In some example embodiments, although clock slowdown requests are immediately forwarded to the clock generator block 142 (i.e. transmitted to the clock generator without being subjected to hysteresis), clock slowdown de-asserts may be subject to a hysteresis process before being forwarded to the clock generator block 142. Subjecting the de-asserts to hysteresis minimizes, or altogether avoids, switching the clock frequency back and forth between the nominal normal operating frequency and one or more reduced frequencies.

A clock update block 148 controls updating the clock and may also generate the clock slowdown ack signal 158 when the clock slowdown has been effected. The clock update block 148 may, in response to receiving assert or de-assert of clock slowdown signal 154, initiate the updating of the clock frequency by the clock generator 142.

Figure 1C:
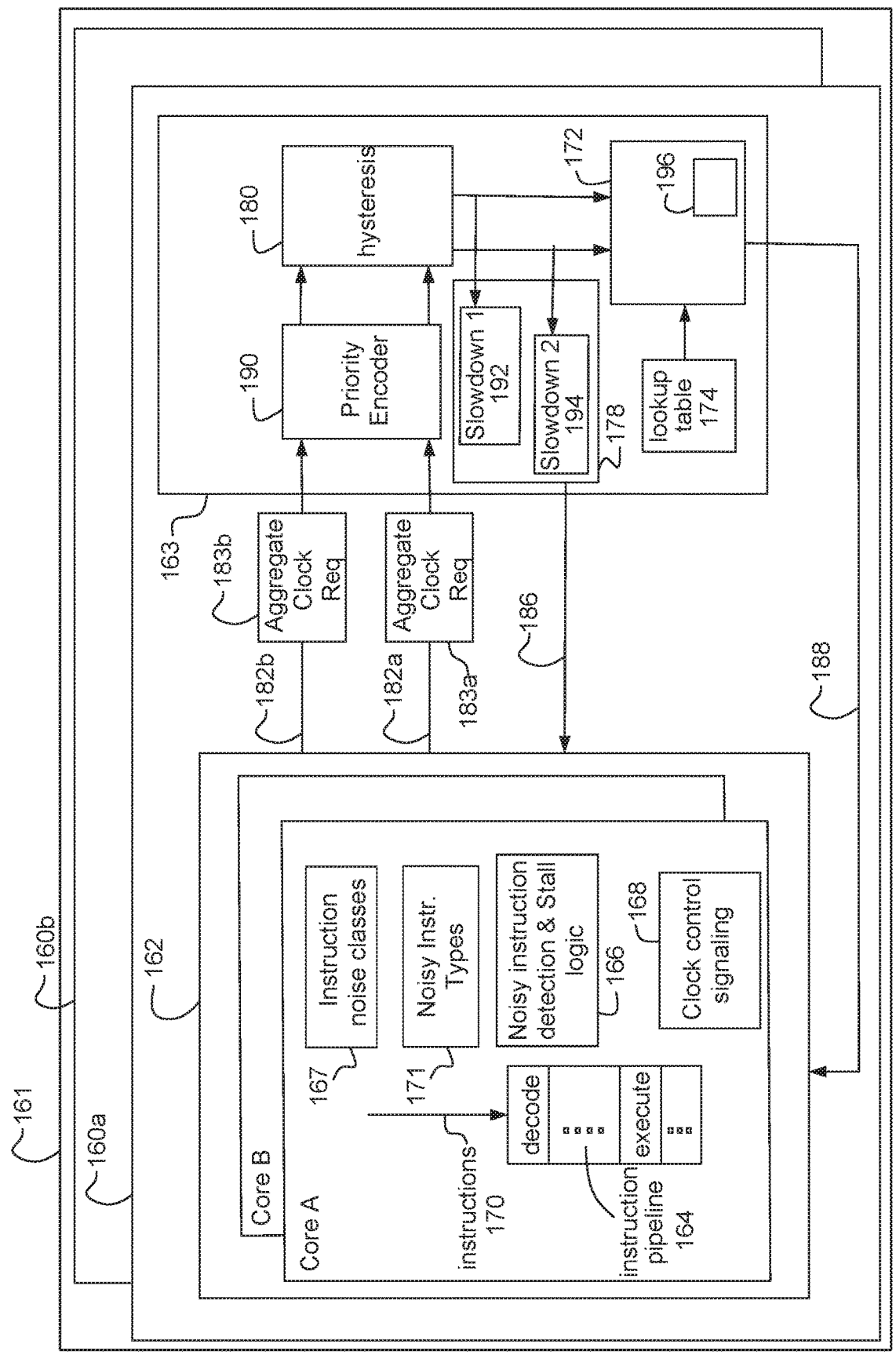
FIG. 1C is another example processor implementing fast clock slowdown according to some example embodiments.

FIG. 1C illustrates a block diagram of another example processor implementing fast clock slowdown according to some example embodiments. The embodiment illustrated in FIG. 1C implements a finer gradation of slowdown enabling better performance (when compared, for example, to an implementation with only a single level of frequency slowdown) in the case of workloads with instructions that consume significantly varying amounts of power.

It has been observed that various compute instructions that are used during certain applications vary significantly in the amount of power they consume when being executed in the datapath. This variation in the power consumed by various instruction types in execution in the datapath, is expected to cause variation in noise and IR drop for the different instruction types. On some example processors, the variation may be in the 10-12% range depending on instruction type. In accordance with an estimate that every 1% of noise may cause a slowdown of approximately 2%, such variation in the power levels can lead to slowing down the processor to a greater than necessary extent. Implementing multiple levels of slowdown as shown in the embodiments of FIG. 1C may enable better performance when there are more than two different instruction types in a workload that consume respective substantially varying amounts power and thus generate respective substantially varying amounts noise on the voltage rails.

Figure 3:
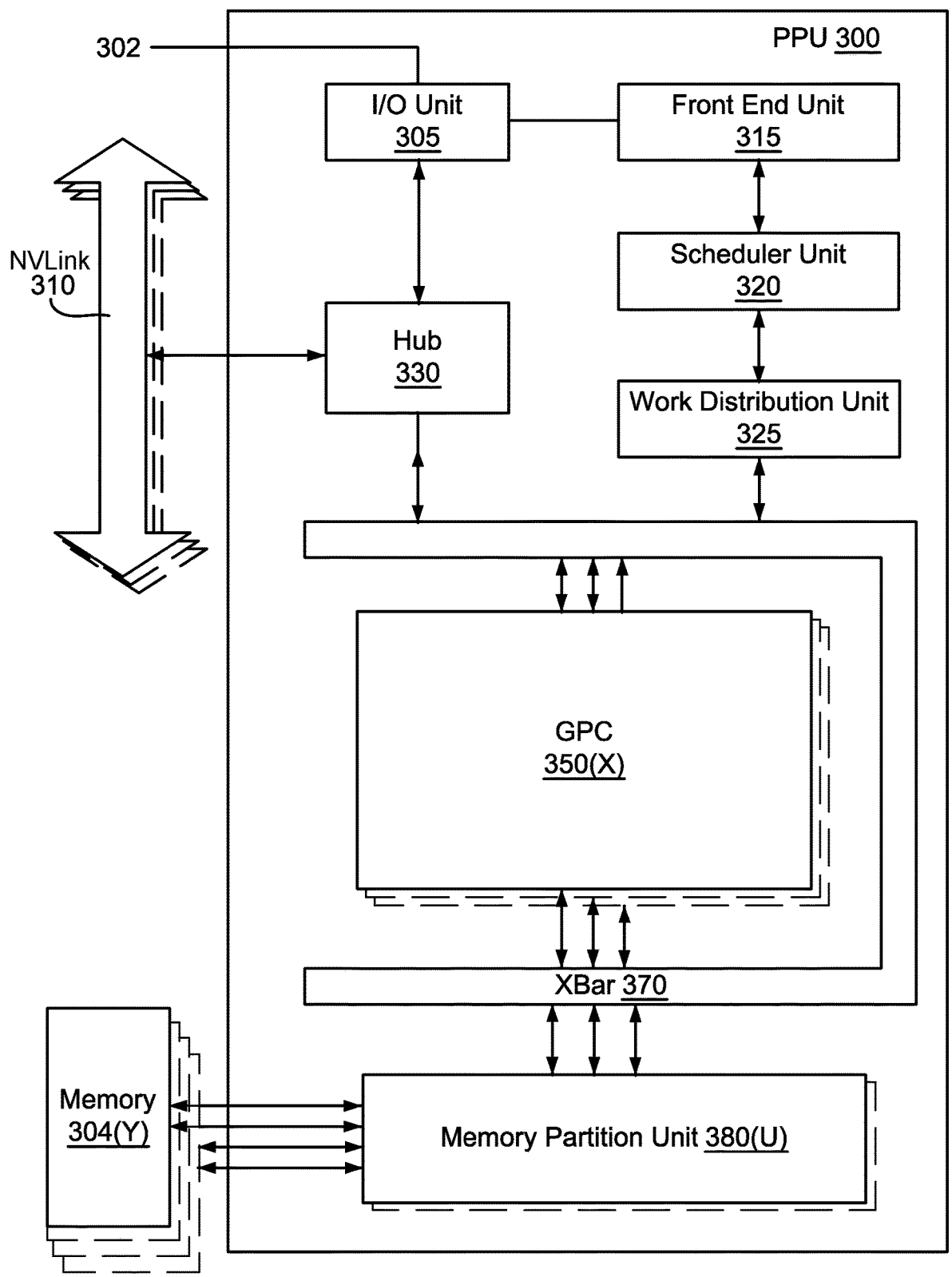
FIG. 3 illustrates a parallel processing unit, in accordance with an embodiment.

A parallel processor 161, such as, for example, the PPU shown in FIG. 3, may include one or more processors (e.g., processors 160a and 160b). Each processor, such as processor 160a, may include one or more processing cores 162. For example, in relation to the embodiment shown in FIG. 3, processor 160a may correspond to the GPC 350 and each processing core 162 may correspond to a respective streaming multiprocessor (SM) 440 (see FIG. 4A).

In each processing core 162, instructions 170 enter a pipeline 164 in which they are decoded and subsequently dispatched for execution. A noisy instruction detection and stall block 166 monitors the pipeline 164 to detect when any instruction of a predetermined set 171 of instructions is decoded. For example, the block 166 may monitor for the decoding of any instruction from a predetermined set 171 of noisy instructions (e.g. high-power instructions). When one or more instructions of the predetermined set is detected, a clock slowdown request signal is generated.

In the embodiments described in relation to FIG. 1C, the clock slowdown request signal 182 (e.g. signals 182a and 183b) may depend on the detected instruction type (e.g. different types of detected instruction types may cause different clock slowdown signals). The detected instructions are classified according to their estimated noise generation. The classification may be performed according to a programmable classification in instruction noise classes block 167. The programmability enables a pre-silicon classification to be modified post-silicon based on simulations on the actual chip. The noise caused by instructions can vary between chips and/or between workloads, and the programmability enables the classification to be tailored to particular environments.

The classification may be made in accordance with a plurality of groups of instruction types, where each group of one or more instruction types is mapped to a respective clock offset. The groups of instruction types may be determined in accordance with the amount of noise that an instruction of each instruction type is expected to generate. For example, all instruction types expected to generate a noise level in a first range may be placed in a different group than all instruction types expected to generate a noise level in a second range. The clock offset specified in the mapping for a group may be the amount of slowdown from a current frequency required for compensating for the voltage drop caused by the expected noise level generated by an instruction of an instruction type in the group.

In some embodiments, the mappings is programmable, thus enabling post-silicon reprogramming or reconfiguration of the mapping of instruction types to particular groups. In this manner the initial mapping made based on pre-silicon design considerations and noise estimations, can subsequently be overridden based on more accurate noise levels of instructions instruction types observed in post-silicon simulations. The pre- and post-silicon terms, as used here, refer respectively to the design stage of the chip before tapeout and to the chip post tapeout. Because the noise level generated by each type of instruction in the actual circuitry (i.e., post-silicon) can, and often does, differ substantially from pre-silicon estimations, the programmability of the mappings as provided in some embodiments enables reclassifying instruction types to groups in accordance with post-silicon simulations which may substantially improve performance of the processor. In some embodiments, the clock offsets associated with each group may also be programmable.

Based on the detection and classification, a clock control signaling logic 168 is configured to generate one of clock slowdown request signals 182a and 182b for each processor core 162. Clock slowdown request signals 182a and 182b may, in an example embodiment, be mapped to a first class of instruction types that are high power consumers and a second class of instruction types that are medium power consumers, respectively. Thus, the clock slowdown request signals 182a may request a greater slowdown than signal 182b.

In example embodiments, for each level of slowdown that is added, a separate wire may require to be routed from the processor core 162 to the clocks block 163. In the illustrated embodiment, a separate wire (i.e. 182a and 182b) is provided for each of the two levels of slowdown. As also noted in relation to FIGS. 1A and 1B, the wire for signaling clock slowdown must be formed so as to minimize latency in order to satisfy the stringent timing constraints required for signaling for clock slowdown and receiving a slowed down clock signal in the interval between instruction decode and execute pipeline stages.

For each slowdown level, the signals from all processor cores 162 may be aggregated with respective aggregation logic (e.g. aggregation clock requests blocks 183a and 183b). In an example embodiment, aggregation may include subjecting the incoming signals to a logical or operation. In some embodiments, aggregation may include subjecting groups of the processor cores 162 to a determination whether any of the respective groups exceed a pre-set threshold for high noise that would trigger a clock slowdown request. The groups may be predetermined based on physical layout of the cores, adjacencies and/or other considerations of the power distribution network. In some embodiments, the clock slowdown requests may be assigned weights based on characteristics of the triggering cores and/or groups. An aggregated clock slowdown request signal from each aggregation block is provided to the clocks logic 163.

The clocks logic 163 may include a priority encoder 190 that receives the clock slowdown requests for each of the plurality of slowdown levels and ensures that the resultant clock frequency 188 is at the lowest requested level. Accordingly, only one of 182a and 182b are active between the priority encoder 190 and the clock generator 172. This is important in order to ensure that there is no failure in the datapath executing the noisiest (e.g. most power consuming) instructions. When the clock generator is shared between cores, this priority encoding may be done to ensure, there is no failure in the datapath executing the noisiest instruction. This priority encoding is not required across different clock generators. So for example, at least some Nvidia GPUs have GPCs which have a collection of TPCs and NAFLL. In some embodiments, the priority encoding can be across the TPCs in a GPC, but not across GPCs as each GPC has its own NAFLL.

In some embodiments, the hysteresis block 180 may be triggered (e.g. a hysteresis counter may be started) any time a clock change occurs even within slowdown levels. Hysteresis may only be triggered when a clock slowdown signal is de-asserted, in order to prevent the frequency being switched back-and-forth between frequencies.

A lookup table 174 may include one or more frequency entries per voltage. According to an embodiment in which either of two slowdown levels 192 and 194 can be signaled to the clock generation block 172, the clock update logic 178 and/or clock generation block 172 may access frequency settings for immediate transition and longer term lock in. For example, three frequency entries per voltage may be accessed in the lookup table 174. For each voltage level an ndiv, ndiv_offset, and dvco_offset may be obtained from the lookup table, used by the NAFLL logic 196 to set clock frequency. The ndiv provides a long term frequency target for low-noise instructions, while (ndiv−ndiv_offset) represents the long term frequency target for high-noise instructions. The dvco_offset provides immediate pulldown codes to rapidly change the clock frequency from ndiv to below (ndiv−ndiv_offset). The changing of the clock frequency is described in further detail below in relation to FIG. 2C.

The ack signal 186 too may require more than one bit to enable smooth handling of slowdown switches. A multibit ack signal 186 enables the stall logic in the processor to handle the acks correctly.

Method for Fast Clock Slowdown Based on Instruction Type

Figure 2A:
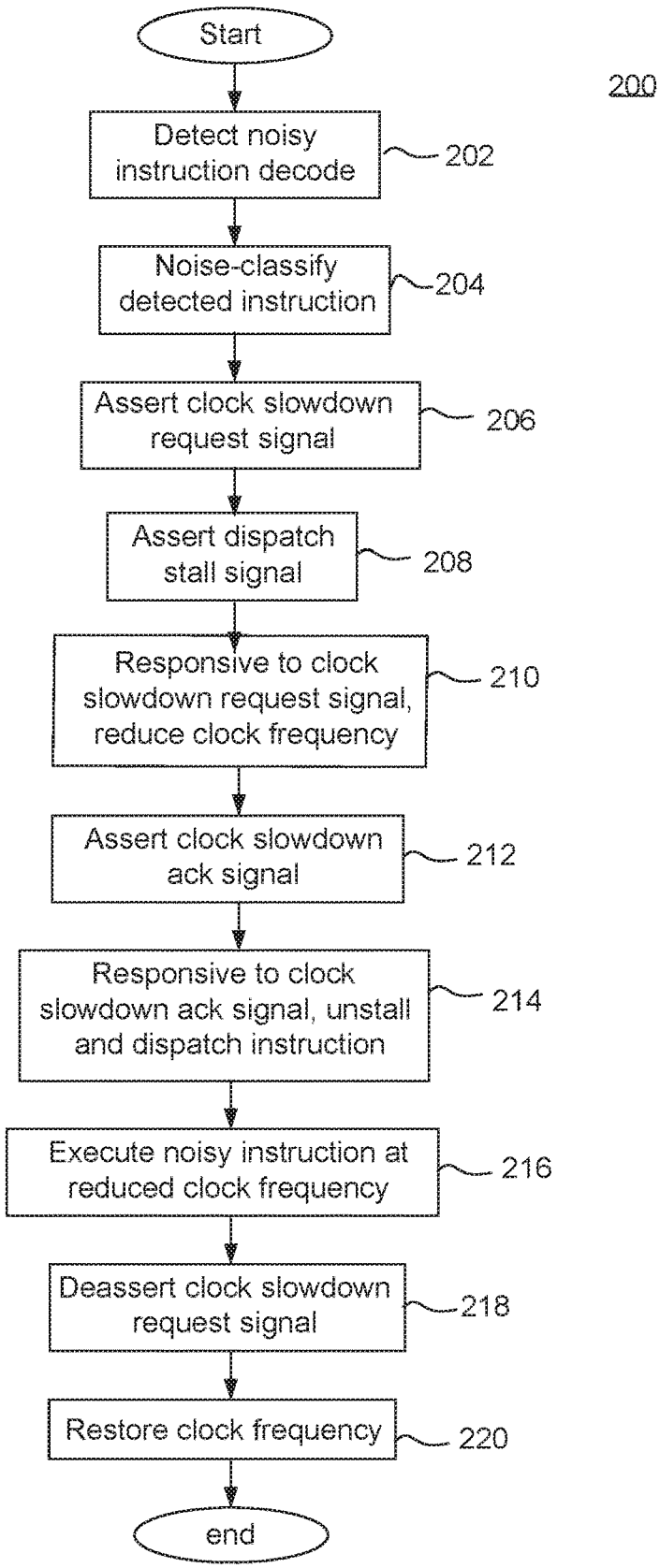
FIG. 2A illustrates a process for performing fast clock slowdown, according to some example embodiments.

FIG. 2A illustrates a process 200 for performing fast clock slowdown, according to some example embodiments. Process 200 may be performed by the processors and clocks logic shown in any of the FIGS. 1A, 1B and 1C. In certain example embodiments, process 200 is implemented entirely in hardware. According to an example embodiment, process 200 may be performed at least partly by an SM as shown, for example, in FIG. 4A.

Process 200 is started when, at operation 202, one or more noisy instructions are detected in the instruction pipeline of a processor such as, for example, any of the processors shown in FIGS. 1A, 1B and 1C. The types of noisy instructions for which the instruction pipeline is monitored may be predetermined and either hardcoded, specified in one or more registers or specified in a programmable table. In an example embodiment, each instruction entering the instruction pipeline is tested to determine whether its instruction type matches any of one or more predetermined instruction types.

At operation 204, the detected one or more instructions are grouped according to the noise level expected to be generated by the detected instruction. After an instruction is decoded in the instruction pipeline, a programmable grouping logic enables the decoded instruction to be grouped into a bucket (e.g. a logical grouping) with other instructions of similar noise characteristics. Each bucket of instructions is configured to assert a clock slowdown signal that goes to the clocks logic.

The programmability of the grouping enables instructions to be moved from one bucket to another based on post-silicon learning and allows any mistakes in pre-silicon power characterization of instructions (e.g. inaccurate estimations of noise levels associated with respective instruction types) to be corrected on silicon. For example, simulations performed on the die post-silicon may show that the noise level of a particular instruction type is different from the noise level corresponding to the grouping/bucket to which the particular instruction is grouped in accordance with the pre-silicon estimations. In this event, programmability of the groupings enables the type of the particular instruction to be re-mapped to a group different from the group to which it was initially mapped based on pre-silicon estimates of noise generation characteristics of the particular instruction.

At operation 206, a clock slowdown request signal is asserted in response to the detection of the noisy instruction at operation 202. In some embodiments, the clock slowdown signal may include an associated clock modulation or slowdown value specified as a frequency offset or a frequency. The value of the frequency offset or frequency may be obtained from a mapping of the group associated with the clock slowdown signal. In some embodiments, the clock slowdown signal may include an associated voltage or voltage offset instead of a frequency or frequency offset.

At operation 208, a dispatch stall signal is asserted to stall the detected instruction before execution. The dispatch stall is optional, and some embodiments may proceed to operation 210 from operation 206 without performing operation 208. For example, in some embodiments, where it can be reliably expected that the clock frequency can be adjusted to a reduced frequency between the time when the clock slowdown request is asserted during or at the end of the decode stage of the instruction pipeline and the execution stage of the pipeline, the pipeline may not be stalled. However, in embodiments where it cannot be reliably expected that the clock frequency will be adjusted in response to the clock slowdown signal in the time before the start of execution, the pipeline may be stalled until the requested clock slowdown is effective.

In order to not significantly degrade performance, the signaling from the processor core (e.g., SM) to the clocks logic should have very low delay. The physical design and the loading on the signals must be carefully managed to ensure very low delay. Ideally, the delay is low enough that, after the signal is asserted, the clocks are slowed down before the instruction hits the execution pipeline, allowing for uninterrupted instruction progress. However, depending on the size of the chip, this may not always be possible and necessitates the need for the interlock logic. In some embodiments the interlock logic stalls the execution of the instruction(s) in the processor core until the clocks logic asserts a signal acknowledging (ack) clock has slowed down. After the ack signal, all of the stalled processor cores are un-stalled in a staggered fashion (e.g., in accordance with a software configurable delay for each core) to ensure there is a gradual ramp in current and avoid di/dt noise issues.

At operation 210, responsive to the clock slowdown request signal being asserted, the clock frequency is reduced. When multiple processor cores are being clocked by the same clock source, the clock slowdown signals asserted by the various processor cores are aggregated (e.g. OR'ed) per group before interfacing with the clocks logic.

The clocks logic includes fast clock slowdown logic and hysteresis logic, and may also include a priority encoder. Additionally, since in some embodiments, the fast clock slowdown works in conjunction with the NAFLL clocking logic, the clocks logic includes logic to ensure the frequency locked loop functionality of the NAFLL can be maintained with the fast clock slowdown.

In some embodiments in which multiple clock slowdown levels can be requested, a priority encoder may be used to ensure that the clock is set to honor the largest slowdown request, corresponding to the highest current instruction, that will be executed across any of the processing cores being clocked by the NAFLL. In embodiments, in which there exists only one slowdown level (in addition to the normal or full speed frequency of operation), a priority encoder may not be needed.

In some embodiments, each clock slowdown signal has a programmable slowdown value associated with it. When a signal is asserted the frequency is reduced by the associated slowdown amount (after the priority encoder) within a predetermined small number of clock cycles by the rapid slowdown mechanism inside the NAFLL. According to an embodiment, the predetermined small number of cycles is 1.

The clock generation inside the NAFLL, in some example embodiments, is through a DVCO made with tunable parallel drivers. In regular operation, the multiple parallel drivers of the DVCO are tuned until the frequency matches the desired frequency of the NAFLL. However, the typical frequency transition from one state to another is done in small tuning changes and takes multiple micro-seconds. In example embodiments, a fast tuning change mechanism through side-band controls is employed to change frequency within one clock cycle. In some embodiments, the DVCO may include an input (e.g. offset_enable) to immediately reduce the number of parallel drivers (to reduce frequency) by some pre-set amount (e.g. an offset) within a short duration (e.g. one or two clock cycles). Decoder logic may be included within the DVCO that only applies the specified offset when indicated by an input to the DVCO (e.g. offset_enable=1). This fast offset mechanism is different from the primary tuning mechanism of the DVCO. The pre-set amount of offset may be a function of the operating voltage. This low latency frequency change mechanism assists in satisfying the stringent timing requirements of example embodiments.

Additionally, in contrast to clock slowdown techniques such as LDIV or clock skipping, the fast tuning change mechanism employed in some example embodiments can slowdown the clock frequency by small percentages (e.g., 2%, 4% etc.) while maintaining duty cycle for all cycles.

The hysteresis logic is used to ensure that the NAFLL is not switching between slowdown modes frequently, which can cause instability in the frequency locking of the NAFLL. Switching from a smaller to a larger slowdown mode happens rapidly. The hysteresis may only be applied going from a larger slowdown to a smaller one, or when the slowdown is being disengaged.

Additional logic may also be required to maintain the frequency locked loop functionality of NAFLL while engaging and disengaging various slowdowns. In some embodiments, two VF curves, "full speed" and "slowdown", are separately characterized on silicon, each representing the maximum frequency ($F_{min}$) for its instruction-appropriate workload. These frequency targets, for the current voltage, are provided to the NAFLL's frequency locked loop. A tunable error accumulator can be used to keep the NAFLL's tunable-DVCO locked to the target frequency—generally at the "full speed" frequency.

When entering a slowdown state, the NAFLL's control loop may momentarily stop tracking the target "full speed" frequency and immediately apply its fast-slowdown mechanism to drop frequency and allow for execution of slowdown instructions. It will then attempt to slowly re-lock to the "slowdown" frequency under the assumption that the fast-slowdown mechanism may have extra margining to account for PVT (process voltage temperature) variation or reduce characterization effort.

When leaving a slowdown state after the hysteresis windows have expired, the NAFLL may once again pause target frequency tracking. An internal sequencer may optionally apply a static, transient, negative frequency offset to reduce the risk of later overshoot (e.g. due to PVT variation or characterization uncertainty). It may then disengage the fast-slowdown mechanism, restoring the frequency to less than or equal to the original "full speed" frequency. Finally, it will move its long-term locking target to the "full speed" frequency, which will gradually restore the frequency to the pre-slowdown frequency. FIG. 2C illustrates the behavior of the clock frequency when the fast slowdown mechanism is disengaged.

At operation 212, in some embodiments, the clock slowdown ack signal is asserted by the clocks logic. Once the slowdown is engaged, an ack may be sent to the processor cores which, in cases where the loop latency of clock slowdown is large, can be used to disengage the stalling of instruction execution.

With the processor cores and clocks logic working in conjunction, the clock frequency can be rapidly modulated, depending on instruction type, thereby allowing instructions of different power to execute at their respective optimal frequencies.

At operation 214, responsive to the clock slowdown ack signal, the instruction execution is unstalled, and the instruction is dispatched for execution. In the event that the instruction pipeline has been stalled, upon receipt of the ack signal, the detected instruction can be dispatched to be executed in the datapath. As described above, instruction execution comprises activating the datapath to perform the instruction.

At operation 216, the one or more noisy instructions are executed at the reduced clock frequency. In other words, one or more noisy instructions are executed by the processor resources (e.g. in the datapath) with the clock frequency being set at the maximum frequency for noisy instructions.

At operation 218, the clock slowdown request signal is de-asserted. The de-assertion can be performed either before or after the unstalling of the instruction pipeline. In some embodiments, the de-assertion may be based on the expiration of a timer set at the time of clock slowdown request signal assertion. A description of two example techniques on which to base the de-assertion of the clock slowdown request signal is provided in relation to FIG. 2D.

After the execution of the instruction(s) is completed at the reduced frequency, at operation 220, the clock frequency is restored. In other words, the clock frequency is restored back to the maximum frequency for normal (i.e. instructions that are not noisy instructions) instructions. An example of the clock frequency restoration is shown in FIG. 2C.

Signaling for Fast Clock Slowdown Based on Instruction Type

Figure 2B:
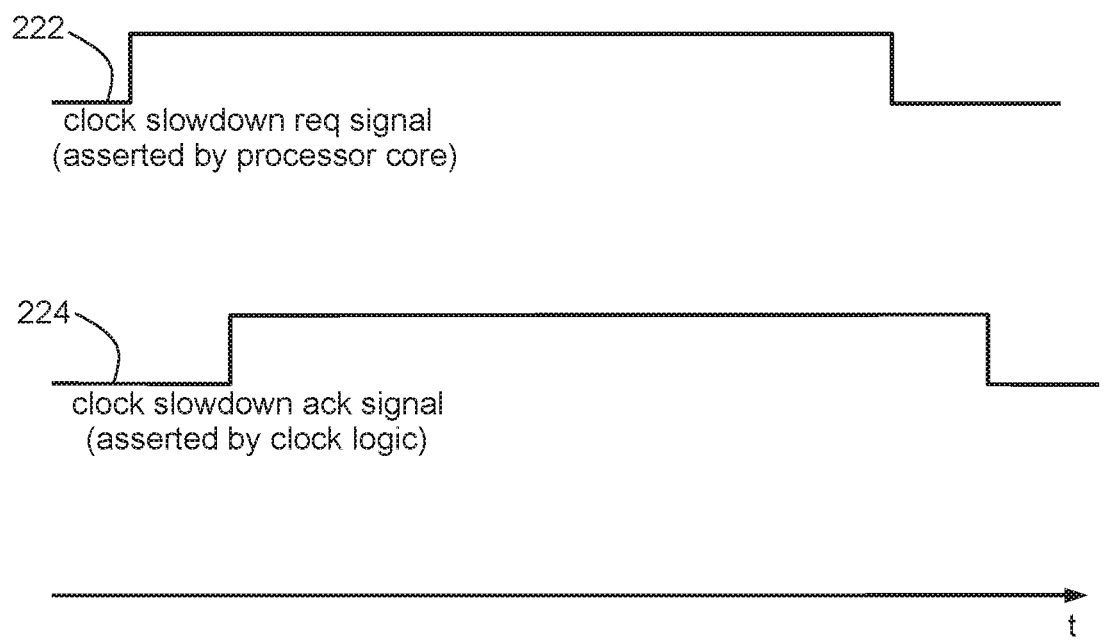
FIG. 2B is a timing diagram illustrating a clock slowdown signal and a corresponding acknowledge signal that can be used in a processor incorporating fast clock slowdown, according to some example embodiments.
Figure 2C:
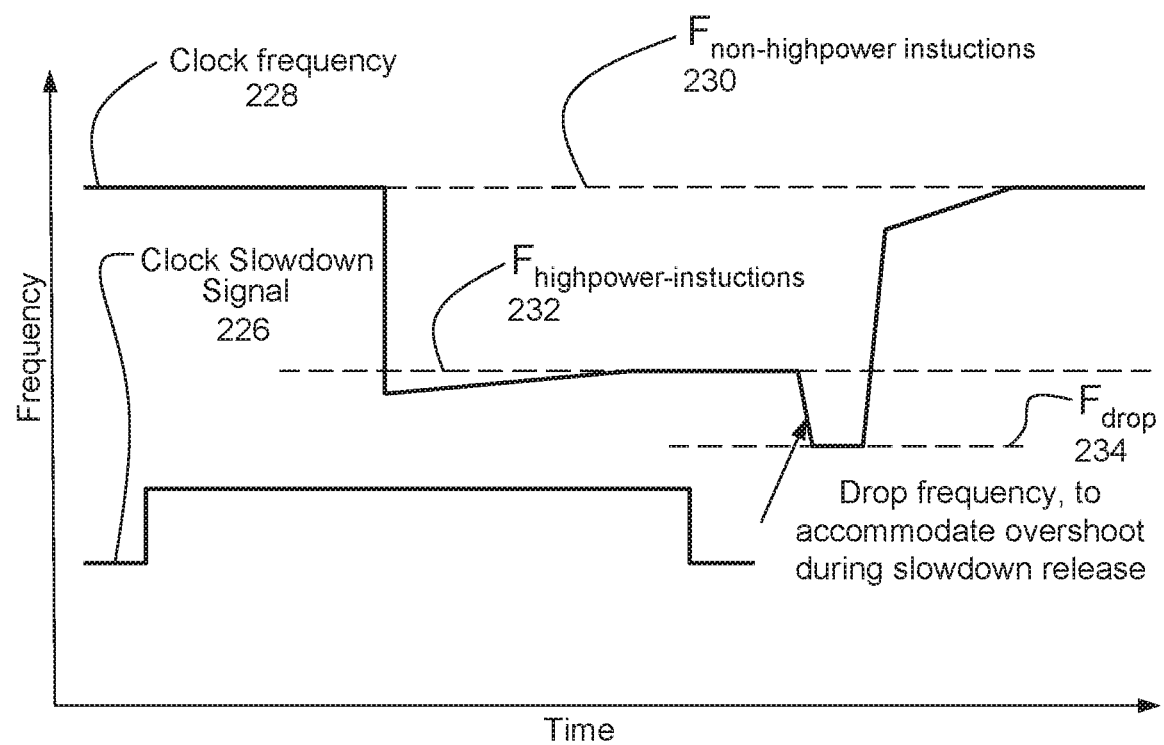
FIG. 2C illustrates the changes in the clock frequency over time as a fast clock slowdown is performed, according to some example embodiments.

FIG. 2B is a timing diagram illustrating a clock slowdown request signal 222 and a corresponding acknowledge signal 224 that can be used in a fast clock slowdown, according to some example embodiments. The timing diagram shows the assertion and de-assertion of each of the signals as time progresses from left to right. Assertion of the signals is illustrated by the rising edge, and de-assertion is illustrated by the falling edge of the representative curves.

As described above, signal 222 is asserted by the instruction pipeline associated with the processing circuitry (e.g., instruction pipelines 108, 134 and 164) when, during the decoding of an instruction, it is detected that the instruction belongs to one or more types of instructions that are monitored. One example of a monitored instruction that can cause substantial noise in the power rails, is a matrix-multiply instruction.

The signal 224 is asserted by the clock logic in response to the request signal 202. In some embodiments, the ack signal 224 is asserted after the clock logic has set the clock to the targeted reduced frequency. In some embodiments, the ack signal 224 may be asserted immediately before, or during, the changing of the clock to the targeted reduced frequency.

As illustrated, in some embodiments, the clock slowdown request signal 222 may remain asserted even after the ack signal 224 is received at the instruction pipeline and/or processing logic and the detected high power instruction is dispatched for execution. The instruction pipeline and/or processing logic may de-assert the request signal 222 after the detected high power instruction has completed execution.

In some embodiments, the ack signal 224 may remain asserted until the request signal is de-asserted. For example, the clock logic may de-assert the ack signal 224 after determining that the request signal 222 has been de-asserted.

FIG. 2C illustrates the changes in the clock frequency 228 over time as a fast clock slowdown is performed, according to some example embodiments. The y-axis represents clock frequency, and the x-axis represents time. The figure illustrates example changes in the clock frequency 228 in relation to a clock slowdown request signal 226, in a system such as that shown in FIG. 1A, 1B or 1C.

In the illustrated example embodiment, the clock may be configured to operate at either of two frequencies: a maximum frequency for non-noisy (e.g. non high power) instructions (e.g., $F_{non-highpower-instructions}$ 230 or "full speed" as referred to in the example described in relation to FIG. 1B) or a maximum frequency for noisy (e.g. high power) instructions (e.g. $F_{highpower-instructions}$ 232 or "slowdown" as referred to in the example described in relation to FIG. 1B). As illustrated, the maximum frequency for non-noisy instructions can be faster than the maximum frequency for high power instructions.

A primary advantage of example embodiments is that it reduces the time during which the processor must operate at a lower frequency (e.g., the "slowdown" frequency) due to noise-related margining requirements. More specifically, example embodiments provide for operating at the reduced frequency only for the duration of executing certain instructions that can cause noise effects that are significant enough to cause a drop in voltage across a circuit.

Accordingly, for a majority of the time it is expected that the processor will operate at frequency 230. When the instruction pipeline and/or processing logic detects the decoding of a monitored instruction, then, as described above, the clock slowdown request signal 226 is asserted. The clock slowdown request signal 226 may remain asserted until the detected instructions have completed execution and/or until a predetermined interval expires. The clock logic is configured to reduce the clock frequency 228 when it receives the clock slowdown request signal 226.

As shown in the figure (see the left most sharp drop in clock frequency 228), when it receives the clock slowdown request signal 226, the clock logic may rapidly slowdown the clock to a targeted reduced frequency 232. In some embodiments, the clock logic may set the initial drop to be a greater drop than the targeted frequency. This drop is shown by the drop in clock frequency 228 proceeding below the targeted reduced frequency 232. After the rapid drop, the clock frequency 208 gradually proceeds to the targeted reduced frequency 232.

The rapid slowdown may be performed by referring to a lookup table to determine the new frequency, and then immediately setting the clock source to the new operating frequency. In some embodiments, the new frequency becomes effective in one clock cycle after the clock logic receives the clock slowdown request signal 226.

After the clock slowdown request signal 226 is de-asserted, the clock logic can restore the clock frequency 228 which is now at the reduced frequency 232 back to the higher frequency 230. The restoration may be initiated by momentarily dropping the frequency to a lower frequency 234 before the higher frequency is restored. The drop to the lower frequency 234 may be necessary in some example embodiments in order to accommodate overshoot.

As can be noticed in the frequency curve 228, the drop to the targeted lower frequency 232 is a sharp drop compared to the more gradual increase of the frequency in the restoration process. As also noted above, the need to quickly effect the clock slowdown between the decoding and dispatch of an instruction to the datapath, the slowdown must be immediately put into effect as fast as possible. However, the restoration is subjected to a hysteresis process so that oscillation between frequencies 230 and 232 can be avoided.

Figure 2D:
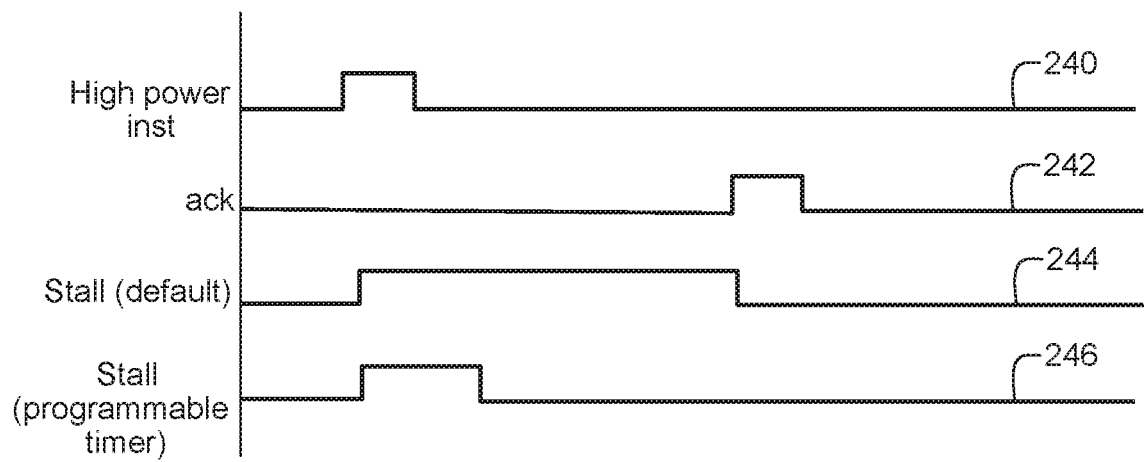
FIG. 2D illustrates a timing diagram illustrative of stalling execution of instructions during a fast clock slowdown, according to some example embodiments.

FIG. 2D illustrates a timing diagram illustrative of stalling execution of instructions during a fast clock slowdown and the releasing of the stall, according to some example embodiments. This figure illustrates timing associated with the detection of the noisy instruction and the assertion of the clock slowdown request signal 240, the corresponding slowdown ack signal 242, a stall signal 244 according to some embodiments, and an alternative stall signal 246 according to some other embodiments.

With respect to both stall signals 244 and 246, as illustrated, they are asserted on the rising edge of the slowdown request signal 240 (or soon after the start of the slowdown request signal 240). However, whereas the stall signal 244 in one embodiment is de-asserted when the ack signal 242 is asserted, the stall signal 246 in another embodiment, which is controlled by a programmable timer, can be de-asserted without waiting for the ack signal. For example, the programmable timer may be de-asserted after a predetermined time duration. The time duration may be programmed in accordance with post-silicon simulation.

Although the fast clock slowdown shown in the systems of FIGS. 1A, 1B and 1C, and the process described in relation to FIG. 2A, may be described in the context of processing unit and certain hardware components, these systems and processes may also be performed by custom circuitry, or by a combination of CPU, GPU, custom circuitry and/or a program. Persons of ordinary skill in the art will understand that any system that performs, for example, methods 200 is within the scope and spirit of embodiments of the present invention.

A Parallel Processing Architecture Using Fast Clock Slowdown

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
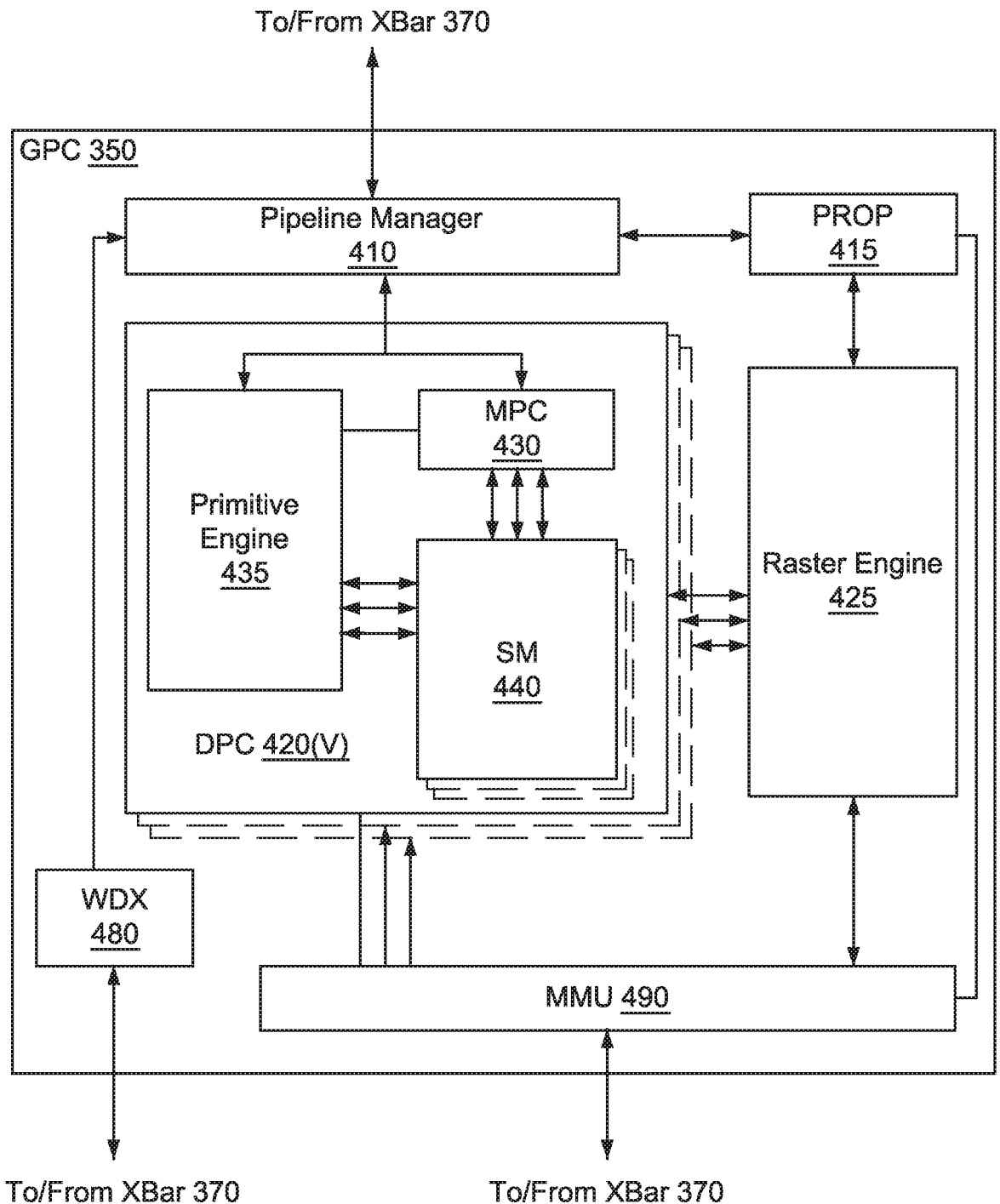
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
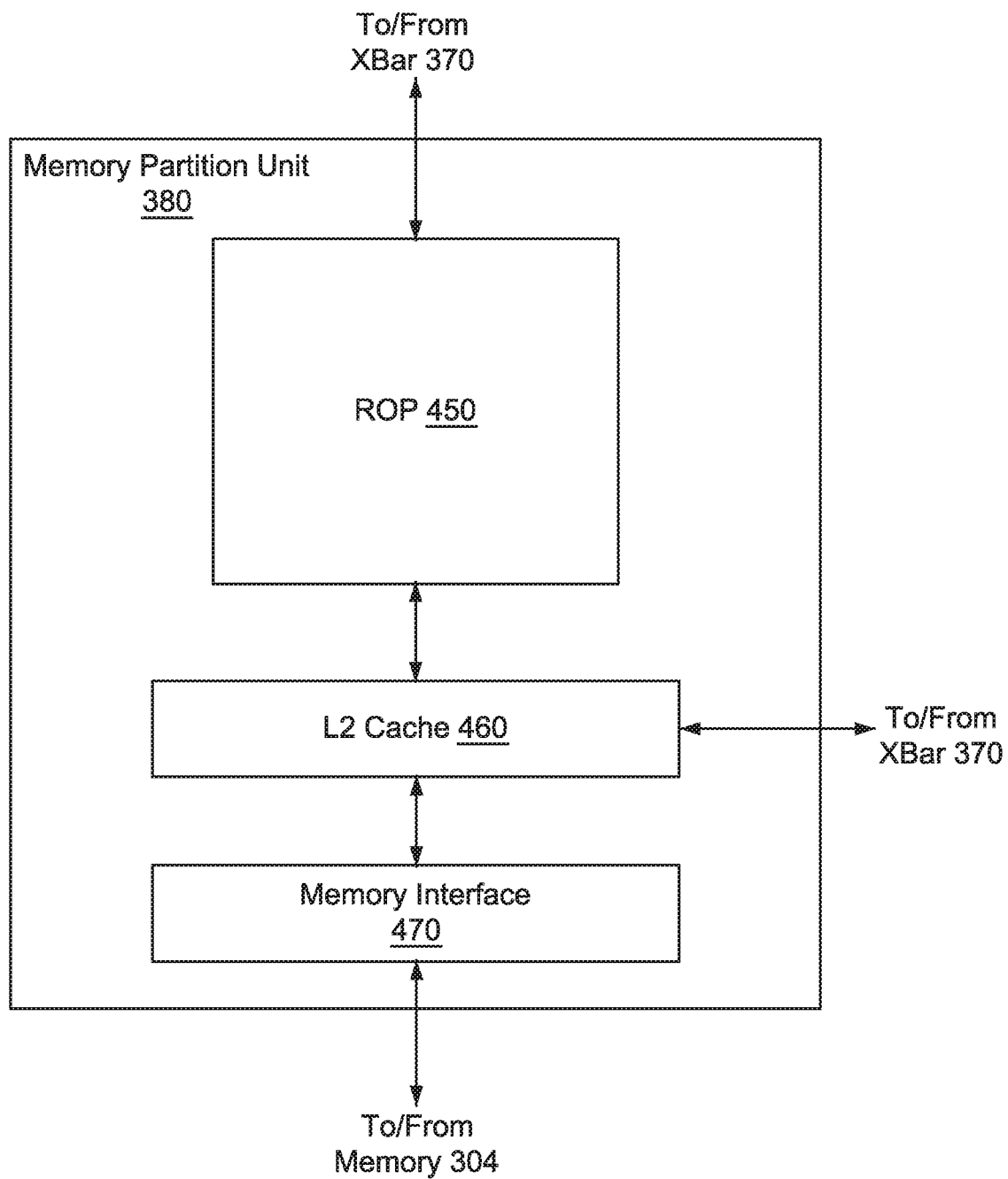
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
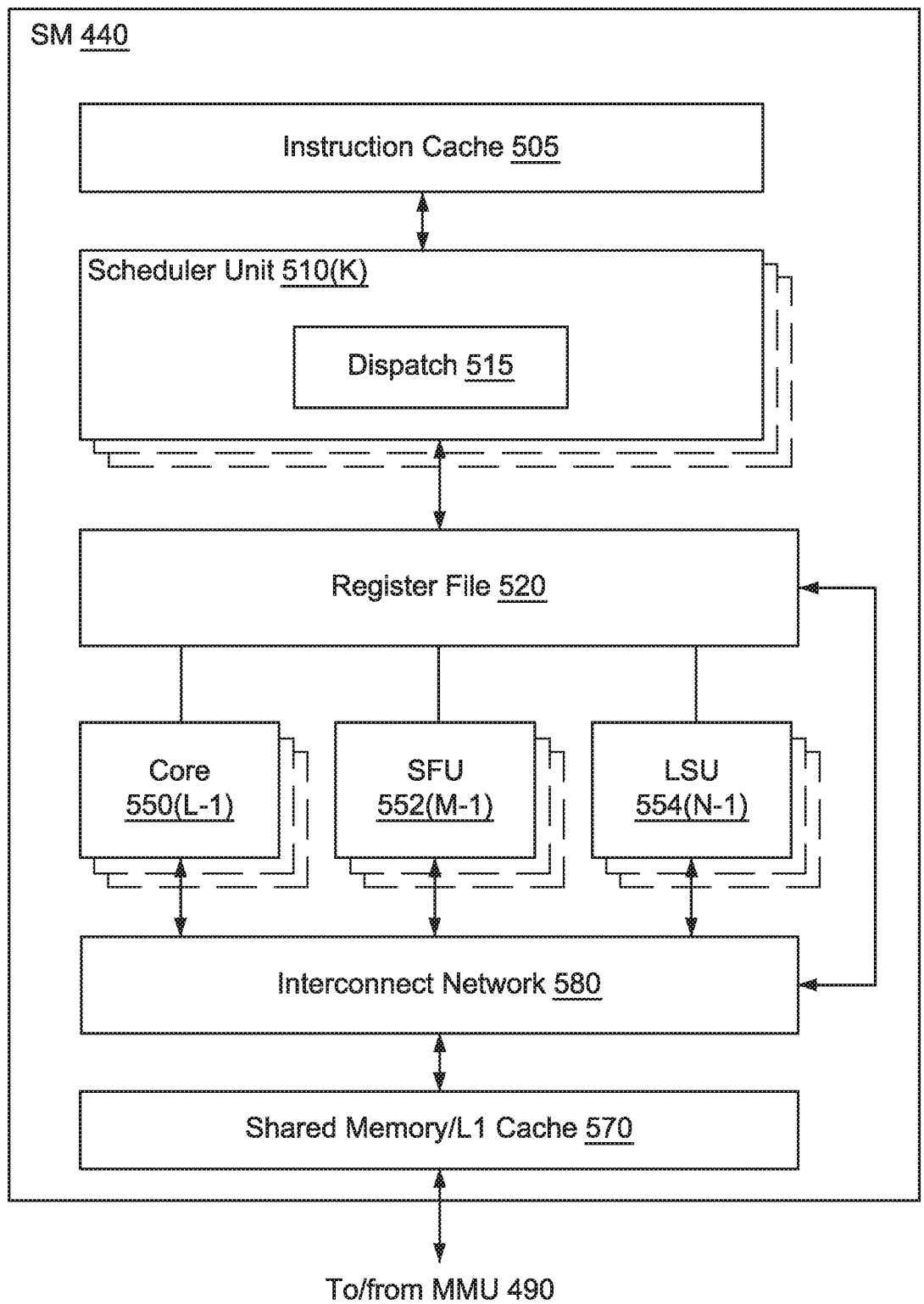
FIG. 5A illustrates the streaming multiprocessor of FIG. 4A, in accordance with an embodiment.

FIG. 5A illustrates the streaming multiprocessor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
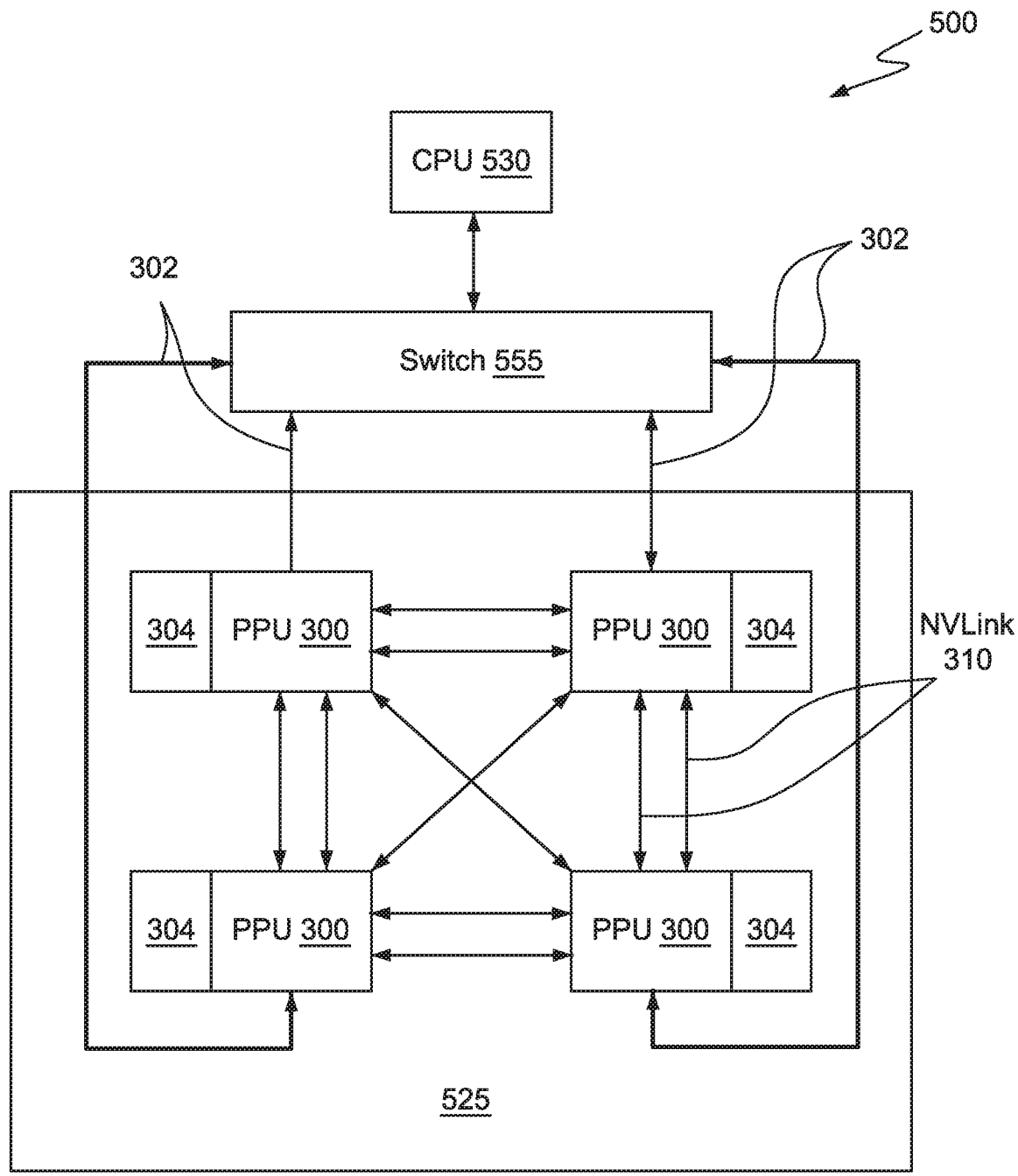
FIG. 5B is a conceptual diagram of a processing system implemented using the parallel processing unit (PPU) of FIG. 3, in accordance with an embodiment.

FIG. 5B is a conceptual diagram of a processing system 500 implemented using the PPU 300 of FIG. 3, in accordance with an embodiment. The exemplary system 500 may be configured to implement the method 200 shown in FIG. 2A. The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
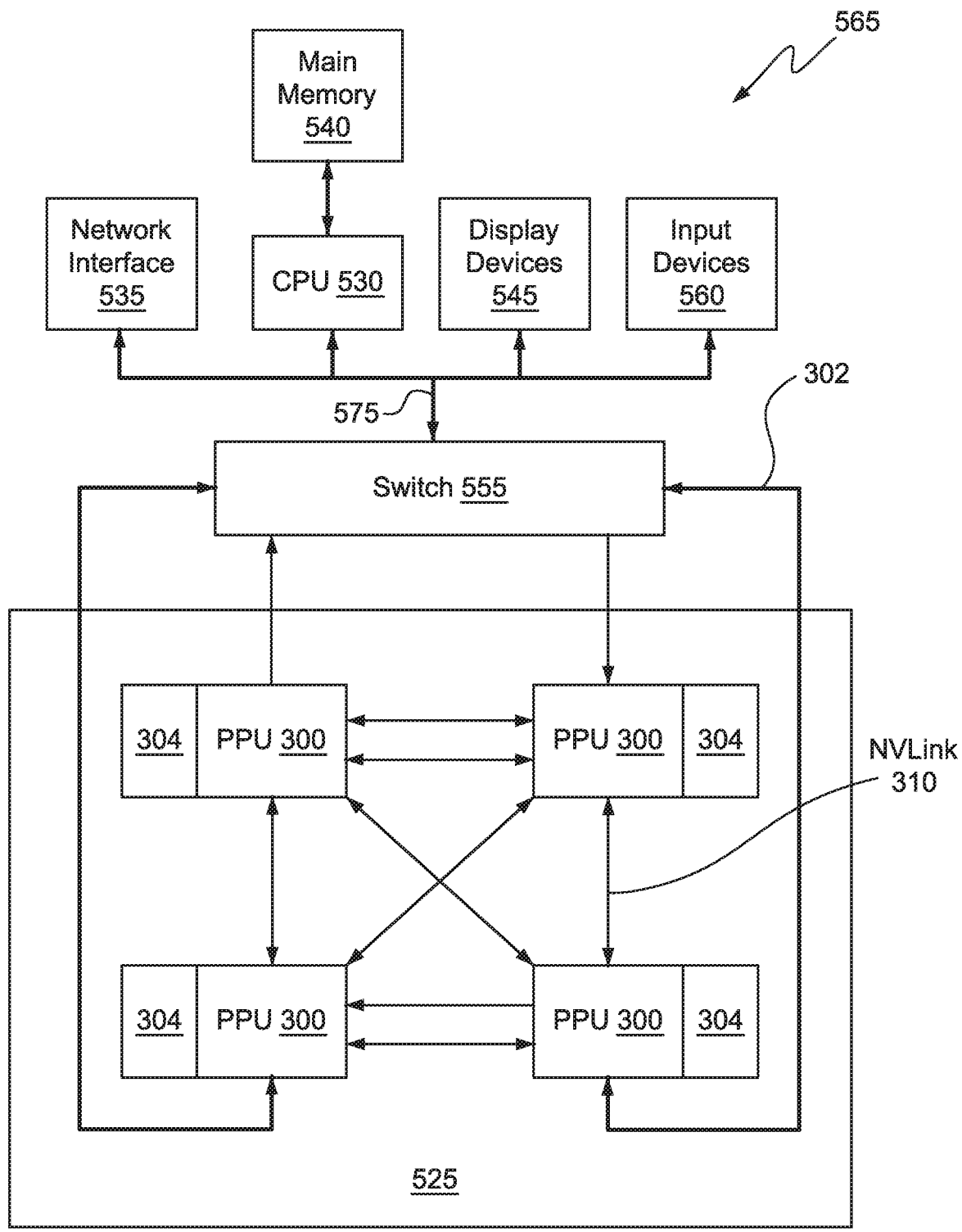
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 200 shown in FIG. 2A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
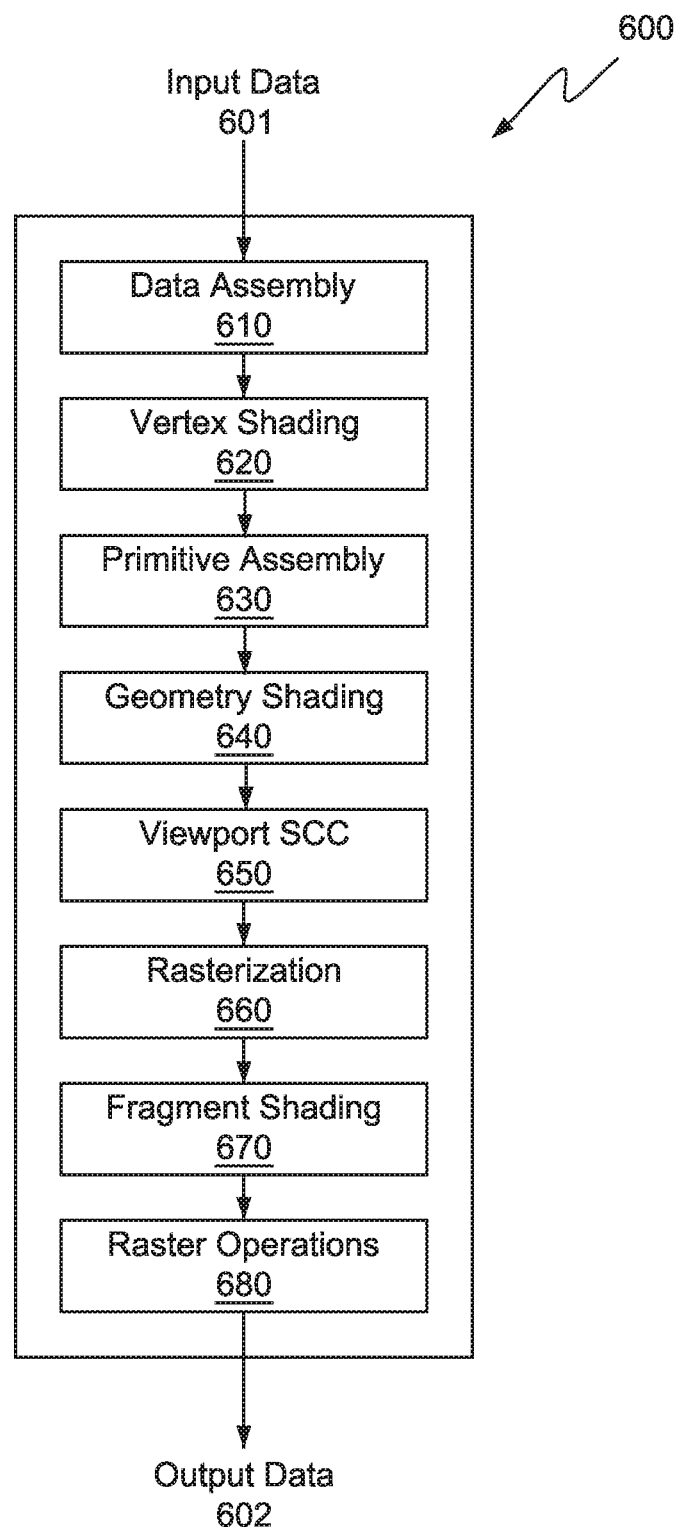
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Example Technical Advantages of Some Embodiments

Certain example embodiments provide for rapid slowdown of clock frequency such that the processor can efficiently reduce the operating frequency only for execution of noisy instructions while enabling non-noisy instructions to be executed at or near the highest nominal frequency for the voltage level.

In contrast to solutions like NAFLL that are designed to address the frequency impact of noise but which address noise that is seen over a large area, example embodiments also accommodate noise that is very localized. Additionally, example embodiments allow for flexibility in IR drop closure, as known power dense units can be closed to a more relaxed IR drop budget, with the expectation for the fast clock slowdown to lower frequency while executing instructions on the power dense units. Relaxing the IR drop budget allows for easing routing congestion and prevents or reduces die area growth.

Numerous modifications and variations of the present invention are possible in light of the above teachings. It is therefore to be understood that within the scope of the appended claims, the invention may be practiced otherwise than as specifically described herein.

What is claimed is:

1. A method of controlling a clock of a processor, comprising:
   detecting an instruction that is predicted to have a predefined noise characteristic, the detecting occurring before execution of the instruction by the processor; and
   responsive to the detecting, changing a frequency of the clock,
   wherein the changing the frequency includes decreasing the frequency by an offset determined to compensate for a predicted drop in voltage corresponding to the predefined noise characteristic, and
   wherein the offset is determined from a programmable mapping of instructions to frequency offset amounts.

2. The method according to claim 1, wherein the changing the frequency includes decreasing the frequency by an offset determined to compensate for a predicted drop in voltage corresponding to the predefined noise characteristic.

3. The method according to claim 2, the method further comprises:
   executing the instruction at least partially while the clock operates at the decreased frequency; and
   increasing the frequency of the clock after the executing.

4. The method according to claim 3, further comprising subjecting the increasing to a hysteresis process.

5. The method according to claim 4, wherein the decreasing is performed without being subject to a hysteresis process.

6. The method according to claim 1, wherein the detecting includes, determining that a type of the instruction matches a type in a predetermined set of instruction types.

7. The method according to claim 6, wherein the predetermined set of instruction types include at least one high power instruction type that is predicted to consume more than a threshold level of power.

8. The method according to claim 1, further comprising:
   configuring the clock to operate at a default frequency, and
   wherein said detecting occurs while the clock is operating at the default frequency, wherein the default frequency is determined in accordance with other instructions that are predicted to have a lower noise level than the detected instruction.

9. The method according to claim 1, wherein the detecting occurs during decoding of the instruction, and the changing occurs before the decoded instruction is executed by the processor.

10. The method according to claim 9, further comprising:
    in response to the detecting, stalling the instruction before its execution; and
    unstalling the instruction in response to the frequency being changed or a timer signal.

11. The method according to claim 1, wherein changing the frequency of the clock comprises changing a frequency of the clock source within a predetermined fixed number of clock cycles after receiving a clock change signal at the clock source.

12. The method according to claim 11, wherein changing the frequency of the clock further comprises identifying a target frequency from a lookup table, and setting the clock source to the target frequency.

13. The method according to claim 12, wherein the changing the frequency of the clock further includes adjusting the frequency in accordance with a noise aware frequency locked loop technique.

14. A method of controlling a clock of a processor, comprising:
    detecting an instruction that is predicted to have a predefined noise characteristic, the detecting occurring before execution of the instruction by the processor; and
    responsive to the detecting, changing a frequency of the clock,
    wherein the detecting includes, determining that a type of the instruction matches a type in a predetermined set of instruction types,
    wherein the predetermined set of instruction types includes at least two groups of instruction types, with each of the two groups having a mapping to a respective frequency offset amount,
    wherein the detecting further comprises determining which of the at least two groups to which the instruction belongs, and
    wherein the changing further comprises adjusting the frequency in accordance with the respective frequency offset amount mapped to the determined one of the at least two groups.

15. The method of claim 14, wherein at least one of a composition of the at least two groups or the respective frequency amounts is programmable.

16. A system comprising processing circuitry and a clock generator controlling a frequency of operation of the processing circuitry, the processing circuitry configured to:
- detect an instruction that is predicted to have a predefined noise characteristic, the detecting occurring before execution of the instruction in the processing circuitry; and
- responsive to the detecting, signaling the clock generator to change a frequency of the clock generator,
- wherein the system further comprises a mapping from a type of the instruction to a frequency offset amount determined to compensate for a predicted drop in voltage corresponding to the predefined noise characteristic, and
- wherein the signaling comprises including the frequency offset amount in the signaling.

17. The system according to claim 16, wherein the detecting is performed during decoding of the instruction, and the processing circuitry is further configured to execute the instruction after said changing the frequency.

18. The system according to claim 16, wherein the detecting includes, determining that a type of the instruction matches a type in a predetermined set of instruction types.

19. The system according to claim 16, wherein changing the frequency comprises changing a frequency of a clock source within a predetermined fixed number of clock cycles after receiving a clock change signal at the clock generator.

20. The system according to claim 19, wherein changing the frequency further comprises identifying a target frequency from a lookup table, and setting the clock source to the target frequency.

21. The system according to claim 20, wherein the changing the frequency further includes adjusting the frequency in accordance with a noise aware frequency locked loop (NAFLL) technique.

22. The system according to claim 16, wherein the processing circuitry includes an instruction pipeline which is configured to block execution of the instruction until a predetermined signal is received from the clock generator or a timer.

23. The system according to claim 16, wherein the system further comprises a plurality of processing cores including said processing circuitry, wherein each of the processor cores receive the frequency from the clock generator, and wherein the clock generator is configured to:
- receive signals from one or more of the plurality of processor cores, and
- change the frequency in accordance with a selected subset of the received signals.

24. The system according to claim 16, wherein the processing circuitry and the clock generator are formed on an integrated circuit.

25. A system comprising processing circuitry and a clock generator controlling a frequency of operation of the processing circuitry, the processing circuitry configured to:
- detect an instruction that is predicted to have a predefined noise characteristic, the detecting occurring before execution of the instruction in the processing circuitry; and
- responsive to the detecting, signal the clock generator to change a frequency of the clock generator,
- wherein the detecting includes, determining that a type of the instruction matches a type in a predetermined set of instruction types,
- further comprises at least a first signaling path and a second signaling path between the processing circuitry and the clock generator, wherein the predetermined set of instruction types includes at least first and second groups of instruction types associated respectively with the first and second signaling paths, with each of the two groups having a mapping to a respective frequency offset amount,
- wherein the detecting further comprises determining which of the at least two groups to which the instruction belongs, and
- wherein the changing further comprises adjusting the frequency in accordance with the respective frequency offset amount mapped to the determined one of the at least two groups.

* * * * *